United States Patent

Guetta

[15] 3,674,941

[45] July 4, 1972

[54] CALL-NUMBER MONITORS FOR TELEPHONES

[72] Inventor: Guy Claude Guetta, 12 Place d'Anuers, Paris, 9, France

[22] Filed: June 1, 1970

[21] Appl. No.: 42,129

[30] Foreign Application Priority Data

June 1, 1970 France ..................................6918008

[52] U.S. Cl. ..........................179/90 AN, 179/81 C, 340/325

[51] Int. Cl. ..........................................................H04m 1/56

[58] Field of Search .......................179/90 AN, 81 C; 40/337; 340/325, 343

[56] References Cited

UNITED STATES PATENTS

| | | | |
|---|---|---|---|
| 3,553,382 | 1/1971 | Knox et al. | 179/81 C |
| 2,877,579 | 3/1959 | Fiore | 179/90 AN |
| 3,508,255 | 4/1970 | Hackett et al. | 340/325 |

FOREIGN PATENTS OR APPLICATIONS

| | | | |
|---|---|---|---|
| 1,202,836 | 10/1965 | Germany | 179/90 AN |
| 1,157,667 | 11/1963 | Germany | 179/90 AN |

*Primary Examiner*—Ralph D. Blakeslee
*Attorney*—Robert E. Burns and Emmanuel J. Lobato

[57] ABSTRACT

A monitor for sensing and displaying a call-number transmitted from a telephone when a telephone number is dialled, comprises an electrical impulse generator for sensing electrical impulses transmitted from the telephone when a number is dialled, and transmitting an amplified train of impulses to a monostable vibrator. The monostable vibrator in turn emits a pulse to a digit counter having a plurality of spaces. A logic circuit is provided including a plurality of gate means each having first inputs electrically connected to the output of the electrical impulse generator and second inputs each connected respectively to an output of a different stage of the digit counter. A plurality of totalizing counters are each electrically connected to the output of a gate means for totalizing the inputs transmitted from the gate means and the output of each totalizing counter is connected to display means.

15 Claims, 4 Drawing Figures

CALL-NUMBER MONITORS FOR TELEPHONES

BACKGROUND OF THE INVENTION

The present invention relates to monitors for sensing and displaying the call-numbers transmitted when a telephone number is dialled.

When dialling a number for a telephone call on an automatic telephone instrument, it is not possible to ensure that the call-number dialled on the dial of the telephone is exactly that which has been transmitted from the telephone. This is a source of frequent and costly errors, particularly in the case of regional or international call-numbers if the person replying is not the person called.

Devices are known which allow the number of the subscriber called to be displayed, which display is placed in the proximity of the instrument of the calling subscriber. These known devices are of a mechanical or electro-mechanical type requiring a considerable alteration to the telephone and, furthermore, are relatively cumbersome.

AIMS OF THE INVENTION

An object of the present invention is to remedy these drawbacks and to produce an apparatus of very simple design, entirely electronic, and requiring no alteration to the subscriber's telephone.

According to the present invention, a monitor for sensing and displaying a call-number transmitted from a telephone when a telephone number is dialled comprises means for sensing electrical impulses transmitted from the telephone when a number is dialled, the sensing means amplifying the impulses sensed for each digit dialled, means electrically connected to the output of the sensing means for emitting a pulse to a digit counter on receipt of the train of impulses from the sensing means, a logic circuit including a plurality of gate means each having first and second inputs, the first inputs being electrically connected to the output of the sensing means, and the second inputs of each gate means being connected resPectively to an output of a different stage of the digit counter, a plurality of totalizing counters are each electrically connected to the output of a gate means for totalizing the impulses transmitted from the gate means and display means electrically connected to the totalizing counters.

Preferably, the sensing means is an electrical impulse generator which senses the electrical impulses transmitted from the telephone when a number is dialled, amplifies the impulses and transmits a train of amplified impulses the number of impulses of which is equal to the impulses transmitted from the telephone lines to the pulse emitting means.

Preferably, the pulse emitting means is a monostable multivibrator which is activated by the first impulse of each train emitted by the electrical impulse generator and which emits a pulse of a duration at least equal to the duration of the train of impulses from the electrical impulse generator.

The display means can comprise a lighted display panel which shows the whole of the number called to the subscriber once the emission of all the selected digits is completed.

The display means can also comprise a means for printing on a tape, provided with a timepiece, printing the various numbers called and the time of the calls, in plain language. In this case an efficient daily check can be made for all numbers from a given telephone.

A preferred embodiment of a motor enables the instantaneous monitoring by a visual display produced by electronic means during the dialling of the call-number. Thus, an immediate check on the call-number being dialled enables any incorrect call-number to be cancelled, should the occasion arise, before being connected to the recipient.

DESCRIPTION OF DRAWINGS

An embodiment of the invention will now be described, by way of example, reference being made to the figures of the accompanying drawings in which.

DESCRIPTION OF PREFERRED EMBODIMENTS

Figure 1:
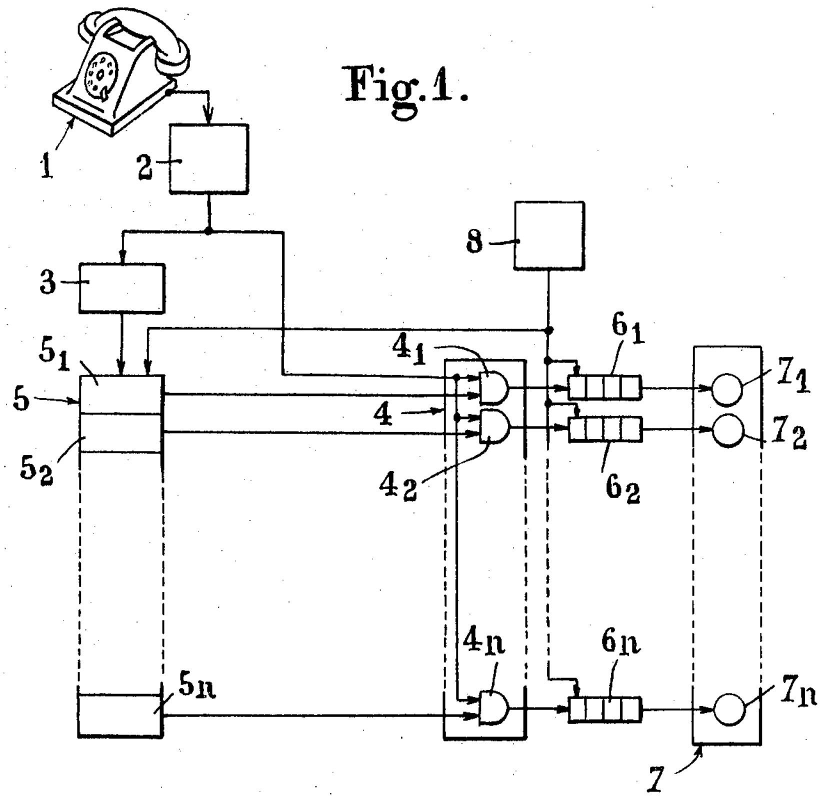
FIG. 1 is a diagrammatic sketch of a telephone apparatus and an associated call-number monitor.

As shown in FIG. 1, a telephone call-number monitor according to the invention is connected to an automatic telephone 1. The monitor comprises an impulse generator 2 which can be connected directly to telephone 1 (as shown) or coupled to a conductor wire of the telephone line through which the call-number impulses are transmitted. The impulse generator 2 comprises an amplifier and passes successive spike trains corresponding to the various digits of the called number to its output. The number of impulses of each train correspond to the decimal value of the digit being called with the exception, however, of "0" to which an emission of 10 impulses corresponds. In other words, each time a subscriber selects digit "1" on the dial of telephone 1, generator 2 emits one impulse; when the digit "2" is selected on the dial, generator 2 emits two impulses, and so on.

The output of impulse generator 2 is connected to the input of a monostable multivibrator 3, and to a logic circuit 4. The monostable multivibrator 3 is activated by the first impulse of each spike train and it remains activated for a period of time which is equal or slightly greater than the total duration of the train. The impulse at the output of the monostable multivibrator 3 is applied to a digit counter 5 which comprises $n$ stages $5_1$, $5_2$, through $5_n$, the $n$ being equal to the maximum number of digits of the telephone call-number (for example, $n = 12$).

Counter 5 totalizes the impulses emitted by monostable multivibrator 3 and which are applied at its input, and the various stages $5_1$, $5_2$ and so on are successively activated.

The logic circuit 4 comprises $n$ ET gates namely, gates $4_1$, $4_2$ through $4_n$ each with two inputs. The first inputs of these various gates are all connected together directly to the output of the impulse generator 2. The second inputs of these gates are each connected to respective stages of the digit counter 5. For example, the second input of gate $4_1$ is connected to the output of stage $5_1$, and that of gate $4_2$ is connected to the output of stage $5_2$, and so on.

The outputs of gates $4_1$, $4_2$ through $4_n$ of the logic circuit 4 are connected respectively to inputs of counters $6_1$, $6_2$ through $6_n$ which totalize the impulses received in series of their inputs. These counters $6_1$ through $6_n$ are connected to respective display components $7_1$, $7_2$ through $7_n$ forming part of a display device 7.

The display components $7_1$, $7_2$ to $7_n$ can be electronic tubes for numerical display so as to give a visual indication or can be printing components so as to provide a recording of the number called, as will be disclosed later on in the specification.

The digit counter 5 and the totalizing counters $6_1$, $6_2$ through $6_n$ are connected to a zero resetting device applied to all the counters either by manual operation independent of telephone 1 or, for example, adapted to operate when the subscriber replaces the hand piece of the telephone on its cradle thereby cutting out the whole telephone.

The function of the call-number monitor, will now be described in a general manner.

When the subscriber, having taken the hand piece off the cradle, dials the first digit of the call-number, the return of the dial to its inoperative position causes a train of $x_1$ impulses to be emitted if $x_1$ is the number in question. The first impulse of the spike train is applied to monostable multivibrator 3 which is then activated. Assuming counter 5 is set to zero, the impulse at the output of monostable multivibrator 3 causes the first stage $5_1$ to be triggered with the result that the output of the latter is brought to a level of a predetermined potential which enables gate $4_1$ to be unblocked. In the following case it is supposed that the two inputs of each of the ET gates $4_1$ through $4_n$ must each receive a signal having a predetermined potential, taken, for example as level "1," so that the gate is unblocked. Each of the impulses emitted by generator 2 is also supposed to be at level "1." Consequently, when the signal of level "1" is at the output of stage $5_1$ of counter 5, only gate $4_1$ is unblocked the other gates $4_2$ through $4_n$ being blocked. The spike train of $x_1$ impulses produced by generator 2 thus passes through gate $4_1$ and these $x_1$ impulses are totalized in counter $6_1$. Once all these impulses have been totalized, the lighted display tube $7_1$ shows the number $x_1$.

After a certain period of time T equal or greater than the duration of the train of 10 impulses, monostable multivibrator 3 returns to its inoperative position and the output passes again to level "0."

When the subscriber selects the second number $x_2$ on the telephone dial, the same process as previously mentioned is repeated.

The first of the $x_2$ impulses emitted by generator 2 causes the activation of monostable multivibrator 3, the output impulse of which then brings about the activation of the second stage $5_2$ of counter 5. Consequently, the output of this stage is brought to level "1" and the gate $4_2$ is unblocked in order to enable the $x_2$ impulses to pass to counter $6_2$. This counter totalizes the $x_2$ impulses and display tube $7_2$ shows the second digit $x_2$ of the call number.

The same process is followed for the successive digits of the call-number and finally, at the end, when all the selection impulses have been sent over the telephone line, the various digits $x_1$, $x_2$ through $x_n$ of the call-number are shown on tubes $7_1$, $7_2$ through $7_n$ and the subscriber can verify that the call-number transmitted corresponds to that to which he desires to communicate. If this is not the case, the subscriber can replace the handpiece in its cradle cutting off the call before the recipient can reply.

One particular embodiment of a call-number monitor will now be described with particular reference to FIGS. 2 and 3 in which the same constituent elements as those appearing on FIG. 1 are given the same references.

In this embodiment, impulse generator 2 comprises a collector 9 consisting of a winding 11 contained in a miniaturized "-ferrinox" housing. This winding 11 forms a current transformer with a wire 12 in the telephone load, over which the call-number impulses are sent. For this purpose it is only necessary to place wire 12 of the telephone lead inside collector 9. Wire 12 should be the wire for call-number emission to the exclusion of other wires, particularly, the earth wire, since the transformer cannot function on the current return wire.

All variations in current over the call-number emission wire 12 during the dialling of a call number, are transformed by collector 9 into an impulse with an amplitude of some several millivolts. This collector emits two impulses, namely, one at the moment when the call-number circuit is opened and the other when the circuit is closed, for each selection impulse. The opening impulses are illustrated at 13 in the form of a wave on line A in FIG. 3 while the impulses appearing when closed are illustrated at 14.

Impulses 13 and 14 appearing at the outlet of collector 9 are applied to an integrated amplifier 15 with differential inputs, the ratio of which is 1,000. This amplifier 15 delivers a symmetrical output signal in relation to ground. It is necessary to cancel out the negative part of the signal so that the logic circuits to be described later, are not impeded. This is achieved by means of diode 16, the anode of which is earthed and the cathode connected to the output of the amplifier 15. Amplifier 15 is fed with +6 volts and −3 volts, the output signal from the diode 16 is positive and has a maximum amplitude of +5 volts. This signal is illustrated on line B in FIG. 3 and it can be seen that it consists of two positive impulses 17 and 18 respectively corresponding to the opening and closing of the call-number emission circuit.

As there are two impulses 17 and 18 for one selection impulse on the call-number emission wire, it is necessary to cancel out one of these two impulses. This is carried out by a stage 19 divided into two parts, the input of which is connected to the output of amplifier 15. The stage 19 consists of a monostable multivibrator the output signal of which is such as illustrated on line C in FIG. 3. This monostable multivibrator is activated by the first impulse 17 and it remains activated for a period of time $t_0$ greater than the interval of time between the two impulses 17 and 18. This interval is in relation to the RC circuit consisting of a resistance 21 and a capacitor 22 in parallel. As a result, the second impulse 18 is ineffective since it is produced while monostable multivibrator 19 is activated and delivers an output signal C to level 1.

Output signal C from monostable multivibrator 19, that is to say, impulse generator 2, is transmitted to the input of monostable multivibrator 3 the activating period of which is in relation to RC circuit consisting of a resistance 23 and a capacitor 24. As has previously been noted, the monostable multivibrator emits a rectangular impulse to its output the duration T of which is slightly greater to that of a train of impulses at its input. This signal is illustrated on line D of FIG. 3. In order to obtain an output signal with a duration T corresponding to the duration of the input spike train, it is necessary, for example, to have a time constant slightly greater than the time interval between two successive input impulses.

Figure 3:
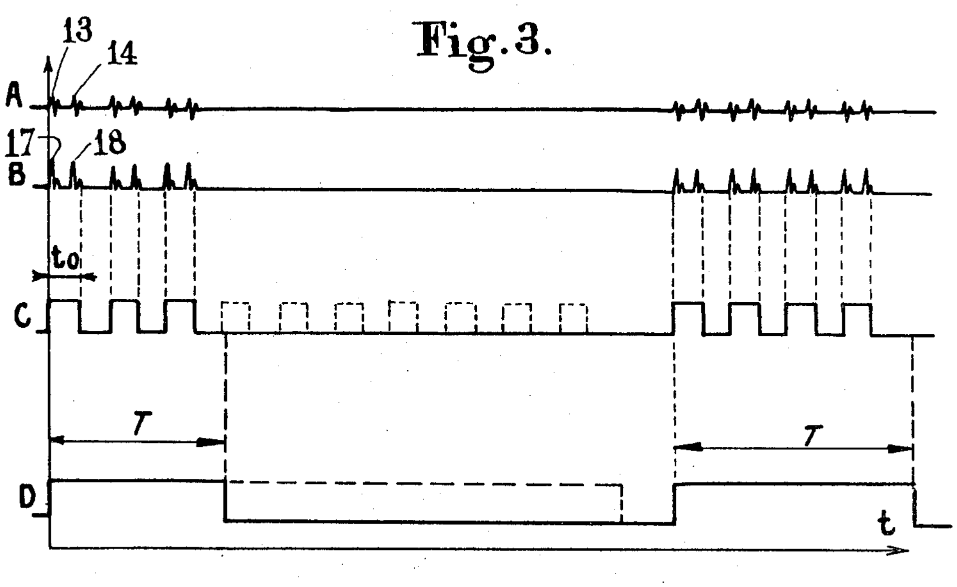
FIG. 3 is a diagram of signal wave shapes appearing at different points in the circuit of the monitor of FIG. 2.

In this case, when the last impulse of the train arrives, multivibrator 3 trips when the time defined by this time constant is over (FIG. 3).

The output signal D of monostable multivibrator 3 is applied at the input of a digit counter 25 to four stages in series which deliver, to the four outputs of this counter, signals having values "1," "2," "4" and "8." These signals are applied to a decoder 26 which delivers from one of ten outputs 0 to 9, a signal corresponding to the combination of the signals supplied by counter 25, expressed in the binary code. The output of the last stage of counter 25 on which the signal of value "8" appears, is applied to the triggering input of a bistable flip-flop 27. When this bistable flip-flop is triggered or reset to zero, its disconnected or zero reset output 27*a* emits a signal at level "1" which is transmitted to the inputs of two ET gates 28 and 29 with two inputs. The other inputs of these two gates 28 and 29 are respectively connected to outputs "0" and "1" of decoder 26. Outputs of gates 28 and 29 are connected to entries of two ET gates $4_1$ and $4_2$ of the logic circuit 4.

Figure 2:
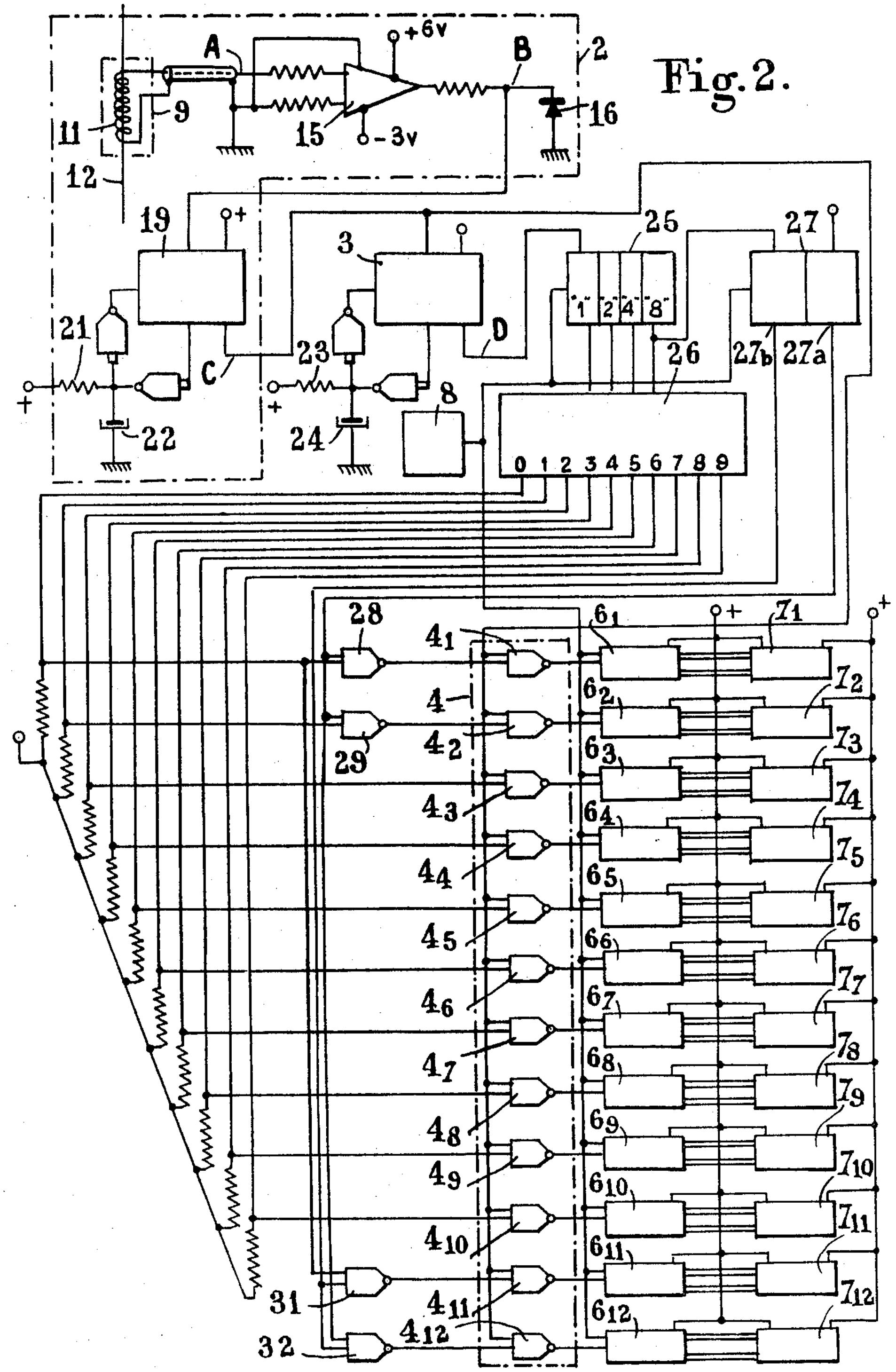
FIG. 2 is a detailed schematic diagram of one particular embodiment of the monitor of FIG. 1.

In the embodiment of the call-number monitor illustrated in FIG. 2, a maximum number $n$ equal to 12 digits for the transmitted number have been provided for. The logic circuit 4 thus comprises 12 gates $4_1$, $4_2$ through $4_{11}$ and $4_{12}$ which are individually and successively unblocked during the emission of the 12 digits of the telephone call-number.

All the first inputs of these gates have a common connection to the output of monostable multivibrator 19 and, consequently, receive signals C. Moreover, the second inputs of gates $4_3$ to $4_{10}$ are respectively connected to the outputs of decoder 26. Conversely, the second inputs for gates $4_{11}$ and $4_{12}$ are connected, respectively, to the outputs of two ET gates 31 and 32 the two first inputs of which are respectively connected to outputs "0" and "1" of decoder 26 and the second inputs of which have a common connection at the triggering output 26*b* of bistable flip-flop 27.

The outputs of gates $4_1$ to $4_{12}$ are respectively connected to twelve counters $6_1$ to $6_{12}$ which can consist of, for example, logic circuits of type SN 7490N. These counters which receive the emitted spike trains at their inputs, also function as converts in order to supply the value of the totalized number in decimal binary code, shown by the signals appearing on the four output terminals.

The decoding and display units $7_1$ through $7_{12}$ are connected to counter/converts $6_1$ through $6_{12}$. These decoding units transform the signals appearing in decimal binary code into one signal applied to a display tube. This tube can be of the cold cathode type which lights up and displays the corresponding digit a flasher light signal which can be applied to a given input, or any other electrical component enabling the same result to be obtained can be used.

The lighted display panel consisting of tubes $7_1$ through $7_{12}$ can be separate from the telephone instrument or, can be attached to the latter, being placed in the pedestal of the telephone.

Figure 4:
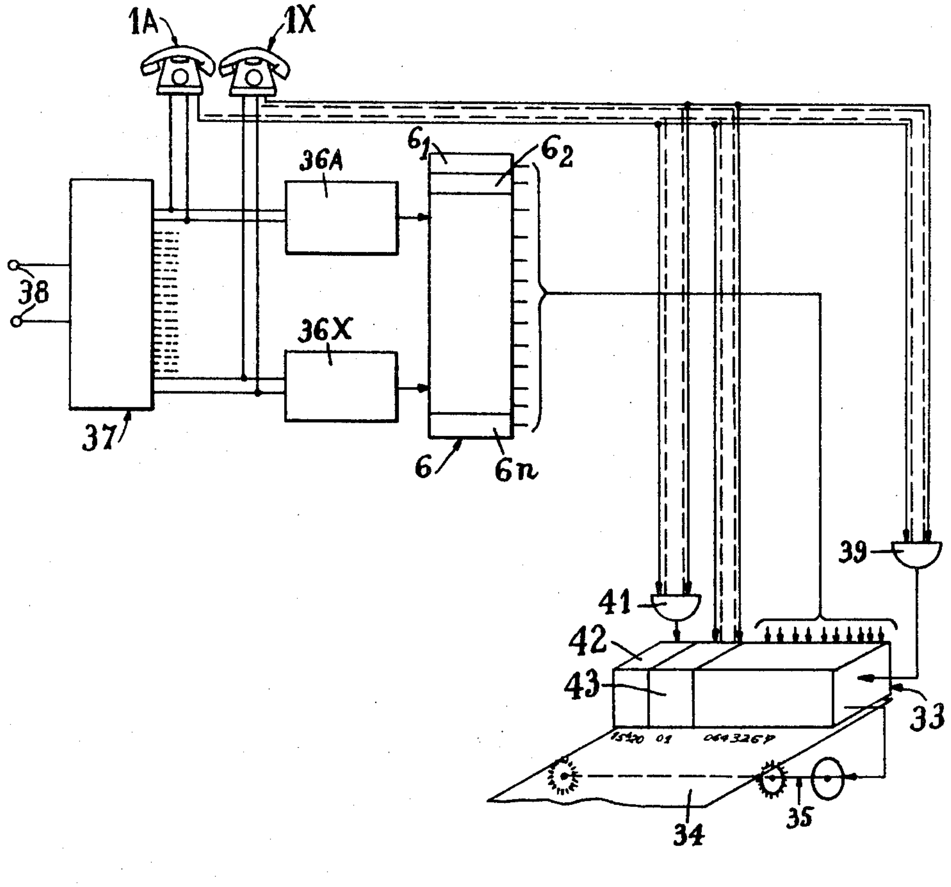
FIG. 4 is a schematic diagram of a modified call-number monitor including a print out device.

As shown in FIG. 4, a modification of the embodiment previously described follows. In this modification the call-number monitor employs a printing means 33 making an impression on a paper tape 34 which moves, step by step, operated by means of a driving device 35.

As well as that illustrated in FIG. 4, several monitoring devices for calls 36A through 36X are respectively working in conjunction with a certain number of telephones 1A through 1X connected to the same switchboard 37 connected to the public telephone system line 38. The counter unit $6_1$, $6_2$ through $6_n$ is common to all monitoring devices 36A through 36X as indicated by reference 6. The outputs of the various counters $6_1$ through $6_n$ are connected to the inputs of the printing means 33 control of which comprises a certain number of printing wheels having digit type-faces on their circumferences. In this way, once a number is recorded in unit 6 of the counters, this number can be printed in plain language on the paper tape 34.

The various telephones 1A through 1X are connected, moreover, by means of an OU gate 39, to one input of the device for resetting to zero 33. In this way, as soon as one of the instruments of any one of these telephone units is lifted off its cradle, an impulse is emitted from this instrument and this impulse is transmitted through OU gate 39 in order to reset the various printing wheels of the printing device to zero.

The telephones 1A through 1X are also connected to the inputs of an OU gate 41, the output of which is connected to a timepiece 42, part of the printing means 33. Consequently, the impulse which appears at the output of one of the telephones 1A through 1X when the instrument is lifted, is also transmitted through OU gate 41 in order to automatically cause the printing on paper tape 34, of the time the telephone call has been requested.

Finally, the outputs of the various telephones 1A through 1X are also connected to a sector 43 of the printing means which ensures the printing of the number of the extension making the call.

The function of the apparatus described is as follows : as soon as one of the instruments is lifted off the telephone extension 1A through 1X, to make an external call through system line 38, the impulse transmitted through OU gate 39 causes the printing means 33 to be reset to zero and, immediately afterwards, the printing of the time of the call by timepiece 42 and that of the number of the extension calling by sector 43 of the printing means 33. For example, by way of illustration, on FIG. 4, at 15.20 hours, extension "01" has placed a call. Next, the various counters $6_1$ through $6_n$ totalize the successive spike trains corresponding to the various digits of the called number and operate the printing of the corresponding digits by the printing wheels in the printing means.

Once the total on the lines has been printed, the printing means 33 itself commands the progressive step of the paper tape 34 to enable the recording of another call-number by means of an internal advancing device.

According to a modification, the paper can be commanded to advance when the telephone instrument is replaced on its cradle.

The apparatus described with reference to FIG. 4 thus enables record of all the numbers called during the course of a given period of time, on the same paper band, as well as the times of these calls and the numbers of the extensions making the calls. It is thus very easy to analyze the telephone traffic in the case where several extensions are connected up to the same switchboard.

Obviously, the printing means 33 can be employed in conjunction with only one telephone extension.

Furthermore, it is possible to use a display device of the formed number by means of luminous tubes as has been described with reference to FIG. 3 and a printing means to record the numbers formed on the same paper tape simultaneously.

The visual display and/or the printing of the transmitted number are all the more accurate and sure as only the selection impulses formed and directed to the public telephone system intervene for display. Thus, if the manual dialling is correct but there is a fault in the telephone only those digits actually composing the call-numbers transmitted and which are registered by the telephone exchange are displayed and/or printed.

The monitor consists of electrical components and uses no other mechanical or electro-mechanical means. It can be connected directly to the input cable of the telephone line without any direct connection to the telephone instrument, itself. However, it is also possible to connect it directly to the instrument or a branch circuit on the network line.

The electrical feed is supplied by the sector, no current being taken from the public telephone system supply.

What is claimed is:

1. A monitor for sensing and displaying a call-number transmitted from a telephone when a telephone number is dialled, the monitor comprising means for sensing electrical impulses transmitted from the telephone when a number is dialled, the sensing means amplifying the impulse sensed for each digit dialled, means electrically connected to the output of the sensing means for emitting a pulse on receipt of the train of impulses from the sensing means, a digit counter including a plurality of stages, the digit counter being electrically connected to the output of the pulse emitting means, a logic circuit including a plurality of gate means having first and second inputs, the first inputs of all of said gate means being electrically connected to the output of the sensing means and the second inputs of each gate means being connected respectively to an output of a different stage of the digit counter, a plurality of totalizing counters each electrically connected to the output of a respective one of said gate means for totalizing the impulses transmitted from the gate means and electronic display means electrically connected to the outputs of the totalizing counters, said pulse emitting means being a monostable multivibrator which is activated by the first impulse of each train emitted by said electrical impulse generator and which emits a pulse of a duration at least equal to the duration of the train of impulses from said electrical impulse generator.

2. A monitor according to claim 1, wherein the sensing means is an electrical impulse generator which senses the electrical impulses transmitted from the telephone when a number is dialled, amplifies the impulses and transmits a train of amplified impulses, the number of impulses of which is equal to the impulses transmitted from the telephone, to the pulse emitting means.

3. A monitor according to claim 1, wherein said display means includes a display panel including a plurality of electronic numerical display tubes each of which is connected to a respective said totalizing counter.

4. A monitor according to claim 3, in which the display panel forms part of the telephone.

5. A monitor according to claim 1, wherein a zero setting device is connected to the digit counter and to each totalizing counter.

6. A monitor according to claim 2, wherein the impulse generator includes a collector comprising a winding positioned adjacent a wire from the telephone, to which an impulse is emitted during the dialling of a number, the winding and wire forming together a current transformer.

7. A monitor according to claim 6, wherein the impulse generator includes an amplifier having an input connected to the collector and an output connected to a diode for eliminating the alterations in polarity predetermined by the output impulses of the amplifier and to the input of the pulse emitting means, the duration of activity of which pulse emitting means is greater than the time interval separating two impulses emitted by the amplifier in response to the opening and closing of the transmission circuit of the call-number.

8. A monitor according to claim 1, wherein a printing means if connected to the outputs of the totalizing counters in order to print numbers called, on a paper tape.

9. A monitor according to claim 8, wherein the printing means includes a timepiece connected to the telephone in such a way, that the time of a telephone call is printed on the paper tape as soon as the handpiece of the telephone is lifted off its cradle.

10. A monitor according to claim 8, wherein the printing means comprises a zero resetting input connected to the telephone in such a way, that the said printing means is reset to zero when a handpiece of the telephone is lifted off its cradle.

11. A monitor according to claim 8, wherein the printing means comprises a selector connected to several telephone extensions in such a way, that the number of an internal calling extension is printed as soon as the telephone handpiece is lifted off its cradle.

12. A monitor for sensing and displaying a call-number transmitted from a telephone when a telephone number is dialled, the monitor comprising an electrical impulse generator for sensing electrical impulses transmitted from the telephone when a number is dialled, the electrical impulse generator amplifying the impulses sensed and transmitting a train of amplified impulses, the number of impulses of which is equal to the pulses transmitted from the telephone, a monostable vibrator electrically connected to the output of the electrical impulse generator for emitting a pulse, the duration of which pulse, is at least equal to the duration of the train of impulses received from the electrical impulse generator, a digit counter electrically connected to the output of the monostable vibrator, the digit having a plurality of stages, a logic circuit including a plurality of gate means each having first and second inputs, the first inputs being electrically connected to the output of the electrical impulse generator, and the second inputs of each gate means being connected respectively to an output of a different stage of the digit counter, a plurality of totalizing counters each electrically connected to the output of a gate means for totalizing the impulses transmitted from the gate means and display means electrically connected to the totalizing counters.

13. A monitor according to claim 7, wherein said impulse generator further includes a monostable multivibrator having an input connected to the output of said amplifier and an output connected to the input of said monostable multivibrator of said pulse emitting means.

14. A monitor according to claim 1, wherein said digit counter comprises a binary code counter having an input connected to said pulse emitting means and having four outputs coded for "1," "2," "4" and "8" and a decoder having inputs connected to the outputs of said binary code counter and 10 outputs connected respectively with inputs of ten said gate means.

15. A monitor according to claim 14, wherein there are 12 said gate means and wherein said digit counter further comprises a bistable flip-flop having an input connected to the "8" output of said binary code counter and two outputs, and four gates having inputs connected with outputs of said flip-flop and outputs connected respectively to four of said gate means to control the transmission of signals from said decoder to said four gate means.

* * * * *